April 29, 1924.

W. PRATT ET AL 1,491,969

HOOP JOINT

Filed July 17, 1923

Inventor
Wm Pratt
Arthur S. Heron

Attorney

Patented Apr. 29, 1924.

1,491,969

UNITED STATES PATENT OFFICE.

WILLIAM PRATT AND ARTHUR SIDNEY HERON, OF OCEAN PARK, SANTA MONICA, CALIFORNIA.

HOOP JOINT.

Application filed July 17, 1923. Serial No. 652,104.

*To all whom it may concern:*

Be it known that WILLIAM PRATT, a citizen of England, residing at Ocean Park, Santa Monica, in the county of Los Angeles and State of California, and ARTHUR SIDNEY HERON, a citizen of England, residing at Ocean Park, Santa Monica, in the county of Los Angeles and State of California, have invented certain new and useful Improvements in Hoop Joints, of which the following is a specification.

This invention relates to improvements in hoop making and has for its object to provide means for securing together the ends of a reed hoop.

Another object of the invention is to provide a telescopic connection for reed or other hoops.

With the above and such other objects in view as may hereinafter more fully appear we have invented the device illustrated in the accompanying drawings in which.

Figure 1:
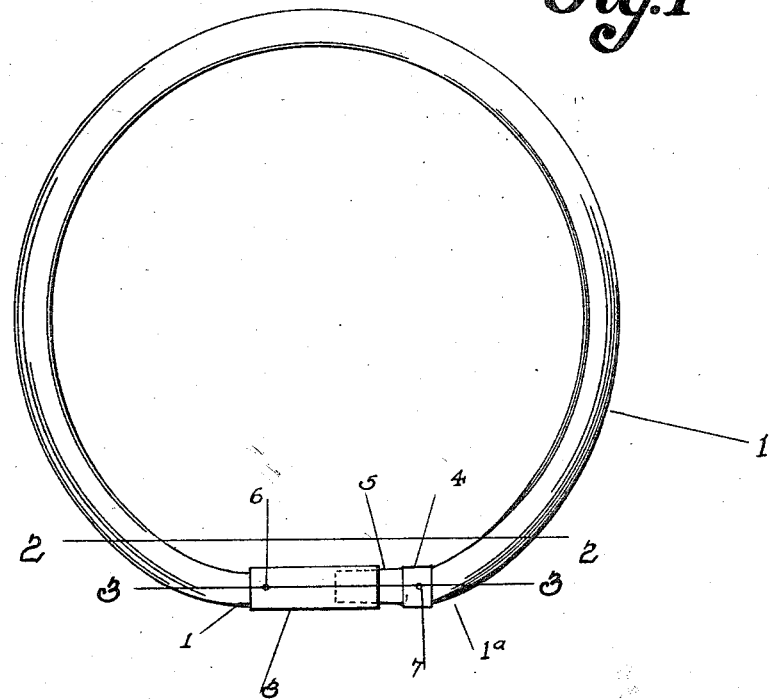
Figure 1 is an elevational view of a hoop formed in accordance with our invention.
Figure 2:
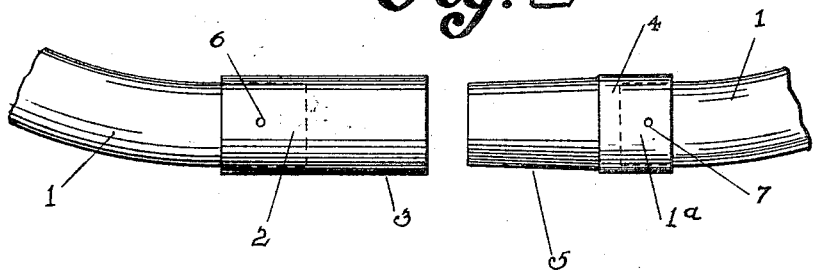
Figure 2 is an enlarged section on line 2—2 thereof.
Figure 3:
Fig. 3 is a cross section on line 3—3 Fig. 1.

Like reference characters indicate like parts throughout the following specification and in the several views in the drawings in which 1 indicates a hoop formed of reed, willow or other flexible wood, fiber or metal having secured to its end 2 a tubular socket 3 and to its end 1ª a tubular socket 4 having a reduced slightly tapering terminal 5 adapted to telescope into the socket 3 and be wedged thereinto through the gradual enlarging inner diameter of said terminal 5.

In case of forming the hoop of wood or fiber the members 3 and 4 are secured thereto by struck-in portions 6 and 7 of said members which bite into the hoop ends. When used in connection with metal hoops the socket members may be either sweated, soldered or pinned on.

There are many uses for a connection for hoops especially in reed work which not only makes the connection secure and eliminates projecting ends but also it lessens time in forming the connections. Furthermore the ends may be quickly separated when it is found desirable to do so.

Having described our invention that which we claim to be new and desire to procure by Letters Patent is:—

1. A connection for hoop ends consisting of a pair of tubular members one of them telescopic within the other and one secured to each end of the hoop forming material.

2. A connection for hoop ends consisting of a pair of tubular members one of them telescopic within the other and one secured to each end of the hoop forming material, one of said members having a tapering terminal whereby said members may be frictionally locked together.

3. A connection for hoop ends consisting of a pair of tubular members one of them telescopic within the other and one secured to each end of the hoop forming material, one of said members having a terminal of a reduced diameter whereby a shoulder is formed against which the other member seats, said shoulder being of a thickness equal to the thickness of the other member.

In testimony whereof we affix our signatures in the presence of two witnesses.

WILLIAM PRATT.
ARTHUR SIDNEY HERON.

Witnesses:
VIOLA D. ANDERSON,
L. S. SHELDON.